United States Patent [19]
Chalvin et al.

[11] Patent Number: 5,852,066
[45] Date of Patent: Dec. 22, 1998

[54] REGENERATED CELLULOSE BASED MATERIALS WITH IMPROVED RESISTANCE TO BLEACH, AND A PROCESS FOR THEIR PREPARATION

[75] Inventors: Christophe Chalvin, Beauvais; Jérôme Ducommun, Aumont en Halatte; Jean-Luc Wertz, Beauvais, all of France

[73] Assignee: Financiere Elysees Balzac, Paris, France

[21] Appl. No.: 533,539

[22] Filed: Sep. 25, 1995

[30] Foreign Application Priority Data

Sep. 26, 1994 [FR] France .................................. 94 11429

[51] Int. Cl.⁶ ....................................................... C08L 1/00
[52] U.S. Cl. ............................... 521/134; 524/35; 524/36; 527/100; 527/312
[58] Field of Search .................... 524/30, 35, 36; 521/134; 527/100, 312

[56] References Cited

U.S. PATENT DOCUMENTS

| | | | |
|---|---|---|---|
| 3,606,993 | 9/1971 | Arthur et al. | 8/116 |
| 3,639,096 | 2/1972 | Wright, III | 8/74 |
| 5,002,984 | 3/1991 | Rainer | 524/30 |
| 5,160,503 | 11/1992 | Smith | 8/115.7 |

FOREIGN PATENT DOCUMENTS

| WO-A-87 03313 | 6/1987 | WIPO . |
|---|---|---|
| WO 94/12034 | 6/1994 | WIPO . |

*Primary Examiner*—Peter Chin
*Attorney, Agent, or Firm*—Bacon & Thomas, PLLC

[57] ABSTRACT

A first object of the present invention is constituted by regenerated cellulose based materials, in particular those selected from cellular cellulose materials, fibers, filaments, sheets, textiles and non-woven materials. They contain an effective quantity of at least one chemical agent which improves the resistance of the material to bleach; the chemical agent containing in its structure at least one nitrogen atom α to a carbon atom and being fixed by at least one covalent bond to the cellulose lattice and/or being trapped in said lattice. Further objects are constituted by the use of chemical agents to improve the resistance to bleach of regenerated cellulose based materials, in particular sponges, and a process for the preparation of these materials.

12 Claims, No Drawings

REGENERATED CELLULOSE BASED MATERIALS WITH IMPROVED RESISTANCE TO BLEACH, AND A PROCESS FOR THEIR PREPARATION

The present invention concerns regenerated cellulose based materials with improved resistance to bleach, and a process for the preparation of these materials.

BACKGROUND OF THE INVENTION

These materials—artificial cellulose based materials—especially consist of cellular cellulose materials of a sponge, sponge-cloth or analogous type, or of fibers, filaments, sheets, textiles or non-woven materials. Used as they are, or after shaping, they are more particularly intended for domestic cleaning and maintenance purposes or for personal hygiene. When used as such, they can come into contact with bleach in varying strengths. Users notice a degradation in structure following such contact.

We now propose a solution to this technical problem of the degradation of regenerated cellulose based materials due to the action of bleach.

Our analysis of the prior art has shown that, to date, this specific technical problem has not been addressed. None of the prior art recommends a method of protecting these cellulose materials against attack by bleach.

In a different context, namely bleaching paper pulp, an improvement has been proposed to processes in which $ClO_2$ is used as a bleaching agent. This improvement is described in International patent application WO-A-87 03313, and consists of partially or totally replacing the $ClO_2$ with HClO. More precisely, HClO is used in the presence of at least one additive selected from:

$ClO_2$;

a compound with a formula which contains a nitrogen atom;

mixtures thereof.

The additive(s) have a positive action, firstly on the luster of the fibers and secondly by preventing their degradation.

In this context, those compounds, with a formula which contains a nitrogen atom, act to protect the substrate (paper pulp, which is cellulose based) against the main attacker (HClO) under particular physico-chemical conditions (pH= 3.5±0.5; θ=35° C. to 70° C., preferably 45° C. to 55° C.; viscous liquid medium in which the attacker and the additives are generally found in solution).

The use of some of those compounds has proved to be of interest within the context of the invention, where the compounds protect a substrate (regenerated cellulose) against a main attacker (ClO⁻) under particular physico-chemical conditions that are different: neutral or basic pH; a wide temperature range, including temperatures which are lower than room temperature; reaction at the interface between liquid (bleach solution) and solid (protective agent fixed on the cellulose lattice); said compounds being fixed and/or trapped in the cellulose lattice.

The disclosure of WO-A-87 03313 does not suggest this use and, in any case, does not enable the result to be foreseen. It is in no way obvious that some of the compounds can be reactive once fixed and/or trapped and in a different environment.

Further, in other contexts different from that of the invention, products (molecules or polymers) are used which cause a certain amount of cross-linking in cellulose. The following in particular are used:

in the textile industry, molecules which confer a crease resistant property on cellulose substrates;

in the paper industry, cross-linkable polymers which improve the wet strength of paper.

The use of some of those substances has proved to be of interest in the context of the present invention as claimed. We have shown, however, that cross-linking per se of the cellulose does not explain its better resistance to bleach. In particular, we have observed that sponges treated with glyoxal under the conditions of the process of the invention (described in more detail below) only have slightly improved mechanical properties (tear resistance improved by cross-linking of the cellulose) but do not have improved resistance to bleach.

OBJECTS AND SUMMARY OF THE INVENTION

The technical problem which is addressed by the present invention is thus complex.

As a result of a great deal of work, primarily aimed at determining the mechanisms involved, we can now provide regenerated cellulose based materials which contain an effective quantity of at least one chemical agent which improves their resistance to bleach; the chemical agent contains in its structure at least one nitrogen atom α to a carbon atom and is fixed by at least one covalent bond to the cellulose lattice and/or is trapped in said lattice. Advantageously, the said chemical agent includes in its structure at least one unit of the type

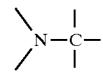

or of the type

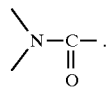

We note here that said chemical agent may include in its structure quaternized nitrogen atoms.

These cellulose materials constitute the first aspect of the present invention insofar as they are novel. The following are therefore excluded from the scope of the present invention:

textiles finished with such chemical agents, selected from the group consisting in the dimethyloldihydroxyethyl-eneurea (DMDHEU), the dimethyldihydroxyethyl-eneurea (DMeDHEU) and their derivatives; textiles containing such agents of the type copolyacrylate with N-methylol functionnal groups as coating and/or impregnation agents and nonwovens containing such agents of the type copolyacrylate with N-methylol functionnal groups as binders;

sponges and fibrous articles containing such agents as a biocide in metallic complexes. Such sponges and fibrous articles are described in International patent application WO-A-94 12034;

sponges containing such agents of the polyamide type as complexing agents for metallic ions. Such sponges are described in United States patent U.S. Pat. No. 5,002, 984.

As indicated above, the materials of the invention can consist of cellular cellulose materials of a sponge or sponge-cloth type, i.e., sponges, sponge-cloths, foamed sponges . . . which can be used alone or integrated in a composite structure. The expression "sponge-cloth" within the context of the present application means a cellular cellulose material comprising two substantially parallel faces and a small thickness. By way of non limiting example, the thickness generally does not exceed 8 millimeters (mm) and is normally within the range 4 mm to 6 mm.

The basic substrate for these cellular cellulose materials is an artificial sponge such as that obtained from the process termed the viscose process and described in particular in French patent FR-A-812 502. That process comprises:

preparing a paste mass, mainly from 1) a cellulose solution such as viscose (the viscose being obtained by the action of an alkaline solution on the starting cellulose paste; this transforms the cellulose paste into an alkali-cellulose, which is reacted with carbon sulfide to form a cellulose xanthogenate which is soluble in soda-containing water), 2) fibrous matter such as cotton, sisal, or linen, to increase the mechanical strength of the finished product, and 3) pigments to provide the color of the finished product, 4) porophores such as Glauber's salt (sodium sulfate decahydrate), soluble and/or fusible crystalline matter for forming pores after coagulation of the paste mass by leaching and/or melting;

shaping the mass, in particular by molding or coating both sides or one side only of at least one screen or deposition on a support strip; and heating, if necessary in a suitable medium, to cause the porophores to react and to regenerate the cellulose. Heating can be carried out either by passing an alternating electric current between electrodes in contact with the paste, or by bringing the paste into contact with an acidic medium (pH less than 1) at temperatures close to 70° C. for several minutes (acid regeneration, which advantageously uses a mixture of sulfuric acid and sodium sulfate, for the manufacture of sponge-cloths), or by bringing the paste into contact with a basic medium (pH close to 12) at temperatures of close to 100° C., for several hours (basic regeneration, which advantageously uses a basic sodium sulfate solution, for the manufacture of sponges).

The products obtained in that way—cellular cellulose materials—are then rinsed, bleached if necessary, dried, and plasticized before cutting and packaging.

Those products (sponges, sponge-cloths . . . ) can then constitute the basic substrate for the materials of the invention, namely regenerated cellulose based materials. Their structure is constituted by a mixture of regenerated cellulose and virgin cellulose provided by the fibrous matter after the xanthation step for the wood pulp.

In general, the term "regenerated cellulose" as used here by the skilled person is intended to mean cellulose which has been directly dissolved (in a solvent for cellulose, such as N-methylmorpholine oxide) or indirectly dissolved (by transformation in a soluble derivative, such as cellulose xanthate or nitrate). To date, only the process described above (viscose process) has been mastered for the manufacture of cellular cellulose materials, in which process the basic substrate is indirectly dissolved (transformation to cellulose xanthate).

In addition to the cellular cellulose materials described in detail above, the present invention also concerns other regenerated cellulose based materials, in particular those in the form of fibers, filaments, sheets, textiles or non-woven materials. Non limiting examples are:

cellulose fibers (in particular those obtained by hot spinning of solutions of cellulose in N-methylmorpholine oxide);

viscose fibers (obtained by spinning a soda-containing solution of cellulose xanthate, after ageing; spinning is carried out in a reprecipitation bath containing sodium sulfate, zinc sulfate and sulfuric acid. The process for the preparation of these fibers is also known as the viscose process);

filaments obtained from viscose fibers, alone or mixed with other fibers (these filaments are generally obtained by carding fibers, doubling into slivers, twisting . . . );

filaments of viscose or other materials;

Cellophane® sheets;

textiles or fabrics obtained from the above filaments, alone or mixed with synthetic filaments, for example;

non-woven materials obtained from the above fibers, alone or mixed with synthetic fibers, for example. These fibers are mechanically, chemically or thermally assembled to constitute the non-woven materials. Webs can also be formed from these fibers.

The regenerated cellulose based materials of the invention can thus exist in different forms. They may contain 100% of regenerated cellulose or a mixture of regenerated cellulose and at least one other type of material (for example virgin cellulose, synthetic filaments or fibers . . . ).

In accordance with the invention, the regenerated cellulose based materials contain at least 20% by weight of regenerated cellulose. In general, they contain 50% to 100% by weight.

In the materials of the invention the cellulose lattice contains an effective quantity of at least one chemical agent which confers on them an improved resistance to bleach. The chemical agent, whose structure contains at least one nitrogen atom α to a carbon atom(and avantageously at least one unit of the type

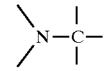

or of the type

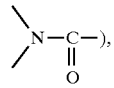

is contained in the lattice in a stable manner to ensure durable protection of the lattice. It is advantageously fixed to the lattice by at least one covalent bond. However, the existence of such a bond does not appear to be obligatory since we have been able to establish a beneficial, durable effect of the agents introduced into the cellulose lattice, in particular polymeric agents, without showing the definite existence of any covalent bonding between the agents and the lattice. These agents would only be trapped in the lattice, primarily mechanically.

In addition, in a variation of the invention a further substance is used to fix the agents in the cellulose materials. In particular, latex or resin type polymers or chelating agents are used. These further substances may themselves be chemical agents which have a beneficial action as regards bleach.

The chemical agents involved in the structure of the cellulose materials of the invention, which have a durable beneficial action, are fixed therein by at least one covalent bond and/or are trapped therein.

We have identified chemical agents which can protect the cellulose substrate from attack by bleach. The chemical formulae of these agents contain at least one nitrogen atom (α to a carbon atom). They have an antioxidizing action.

Particular examples are:

ethanolamine ($C_2H_7ON$);
diethanolamine ($C_4H_{11}O_2N$);
triethanolamine ($C_6H_{15}O_3N$);
N-(hydroxymethyl)nicotinamide ($C_7H_8O_2N_2$);
N-(hydroxymethyl)phthalimide ($C_9H_7O_3N$);
acetanilide ($C_8H_9ON$);
acetamide ($C_2H_5ON$);
caffeine ($C_8H_{10}O_2N_4$);
cysteine ($C_3H_7O_2NS$);
alanine ($C_3H_7O_2N$);
3,4-dihydroxyphenylalanine ($C_9H_{11}O_4N$);
dimethyloldihydroxyethyleneurea (DMDHEU: $C_5H_{10}O_5N_2$) and its derivatives;
dimethyldihydroxyethyleneurea (DMeDHEU: $C_5H_{10}O_3N_2$) and its derivatives;
aminopolyamides with reactive epoxy and/or azetidinium functions;
copolyacrylates with N-methylol type functions.

More generally, the following are suitable for use within the context of the invention in the cellulose lattice of a regenerated cellulose based material: amines, amides, amino acids, urea derivatives, and polymers containing functions of the type:

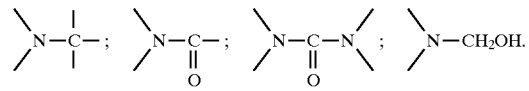

These regenerated cellulose based materials, which durably contain at least one compound of this type, form an integral part of the present invention (excluding the following known prior art:

- certain textiles which have been finished with such agents, and more precisely cellulose fiber textiles and their mixtures with synthetic fibers which contain DMDHEU (or a derivative thereof) or DMeDHEU (or a derivative thereof) as a finishing material to render them crease resistant and shrink resistant; textiles containg such agents of the type copylacrylate with N-methylol functionnal groups as coating and/or impregnation agents and nonwovens containing such agents of the same type as binders,
- sponges and fibrous articles described in application WO-A-94 12034 which contain such agents as a biocide in metallic complexes,
- sponges described in U.S. Pat. No. 5,002,984, which contain such agents of the polyamide type as complexing agents for metallic ions).

These compounds or agents, which can protect the cellulose substrate, must first be introduced without damage into the cellulose lattice and then remain there for a certain period in order to be effective during use of the substrate.

To this end, chemical agents are advantageously selected which, in their free state before incorporation into the cellulose lattice:

- have a boiling point which is compatible with the process used for their incorporation;
- are stable in aqueous media;
- are advantageously soluble in aqueous media;
- advantageously contain at least one chemical function in their formula which can react with cellulose.

These conditions allow incorporation and may render it easier, and optimize retaining these agents in the cellulose lattice.

The agent must have a low vapor tension at the temperatures used for incorporation. This is to enable a maximum amount of the agent to be incorporated under reasonable conditions.

The agent must be stable in aqueous media. This is required both with respect to the incorporation process for the agent into the cellular cellulose material and for subsequent use of the material.

The agent is advantageously soluble in aqueous media. The incorporation of insoluble agents is not excluded, however this involves using and recycling solvent(s) and/or dispersion(s), which complicates the incorporation process.

The agent used advantageously contains in its formula at least one chemical function which can react with cellulose. This type of agent is particularly preferred. The reaction can be of different types. It must be able to be carried out under conditions which do not substantially alter the cellulose substrate. This excludes reactions in very basic media or at high temperatures for fixing the agents in the cellulose lattice. Advantageously, the reaction creates at least one covalent bond between the agent and the cellulose.

We have essentially developed two embodiments of the invention. In the first embodiment, we obtained regenerated cellulose based materials with an improved resistance to bleach by incorporating an effective quantity of molecules with a "low" molecular weight, i.e., simple molecules, into the cellulose lattice. In the second embodiment, we obtained the same type of material by incorporating an effective quantity of molecules with a much higher molecular weight, i.e., polymers, into the cellulose lattice.

For simplicity, the present description and accompanying claims refer to molecules for the first embodiment and polymers for the second embodiment.

The first embodiment is now described.

In the first embodiment, at least one (simple) molecule type is fixed and/or trapped in the cellulose lattice of the regenerated cellulose based materials of the invention. Fixing is advantageously by means of at least one covalent bond. Two covalent bonds may be involved. In this hypothesis, a certain amount of cross-linking of the cellulose lattice fixes the protective agent therein.

The molecule used, which contains in its formula at least one nitrogen atom α to a carbon atom, advantageously includes at least one unit of the type:

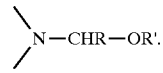

In general: R=H, OH or a complex radical (particularly in the case of cyclic molecules);

R'=H, —CH$_3$, —C$_2$H$_5$.

Molecules containing the unit

or the unit

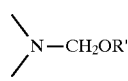

are particularly preferred.

The following are particularly recommended for use as protective agents:
N-(hydroxymethyl)nicotinamide (formula I below);
N-(hydroxymethyl)phthalimide (formula II below);
dimethyloldihydroxyethyleneurea (DMDHEU: formula III below) and its derivatives;
dimethyldihydroxyethyleneurea (DMeDHEU: formula IV below) and its derivatives.

The chemical formulae of these compounds are as follows:

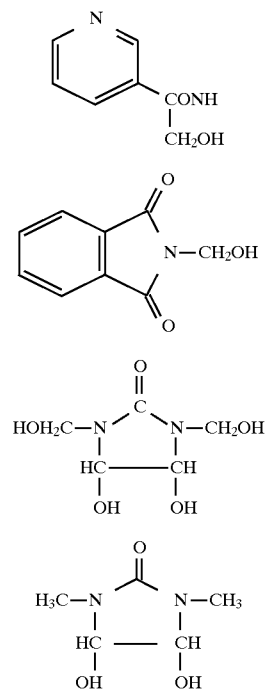

Regenerated cellulose based materials of the invention containing these compounds are particularly preferred. The compounds are advantageously bonded to the cellulose, mainly by ether bridges.

It should be noted here that compounds of the type shown in formulae (III) and (IV) are sold as fabric finishers, in particular by HOECHST (in the form of resins ARKOFIX PL8211, ARKOFIX V4200 (DMDHEU and its derivatives) and ARKOFIX NZF (DMeDHEU and its derivatives)). These finishers render textiles of cellulose fiber, or mixtures of cellulose and synthetic fibers, crease resistant and shrink resistant.

This embodiment does not exclude the use of molecules containing other units in their formula apart from:

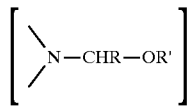

as indicated above, in particular molecules having the following unit in their formula:

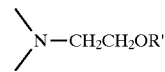

or at least one aldehyde function and one amide function.

These molecules are introduced into the regenerated cellulose based material, advantageously at the end of their manufacturing process, and reacted under suitable conditions to fix them to the cellulose. Heat treatment is generally used, in the presence of a catalyst. The treatment is described in more detail below.

As indicated above, the scope of the first embodiment of the invention does not exclude the use of molecules which are not bonded by a covalent bond to the cellulose lattice. They may have been introduced and simply be trapped in the lattice, in particular in a latex or a resin. A chelating agent can also be used to trap these molecules. The agent is introduced into the cellulose prior to or at the same time as the molecule. A polymeric ligand/transition metal complex of the type described in application WO-A-94 12034 can be used as the chelating agent. Chitosane is particularly recommended for use as the polymeric ligand.

The second embodiment of the invention will be described below, in which at least one polymer is present in the regenerated cellulose based material lattice as a protective agent.

In this embodiment, the materials contain an effective quantity of at least one polymer whose formula, in its free state, advantageously contains functions of the type:

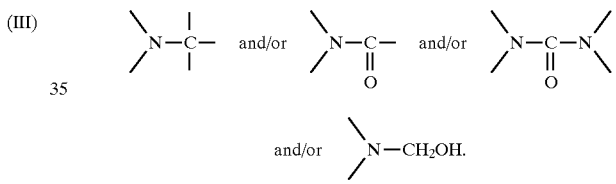

The presence of these functions in the main chain of the polymer, or in at least one of its side chains, ensures the presence of nitrogen atoms. The following functions can be mentioned: amines, amides, urea derivatives, N-methylol derivatives . . .

The polymer is fixed and/or trapped in the cellulose lattice. This result can be obtained by a simple intimate mixture of the polymer and cellulose in solution before regeneration of the latter. (Chitosane can so be used). It is also possible to introduce the polymer into the material as a mixture in a latex or resin, then heat treat the assembly. Advantageously, a polymer is used which is self crosslinking and/or condensable with the cellulose.

Preferably, then, the materials of the invention contain a cross-linked polymer whose formula contains the functions described above, fixed and/or trapped in the cellulose lattice. This embodiment of the invention will be described below in more detail.

Advantageously, the polymer has been cross-linked in situ, i.e., incorporated into the cellulose lattice in a non cross-linked state, then treated to effect cross-linking. In situ cross-linking fixes and traps it in the cellulose lattice.

In this case, the polymer used must contain chemically reactive functions which can effect cross-linking (or autoaddition), in addition to nitrogen atoms. Advantageously, it also contains chemical functions which can react with the cellulose. In a particularly preferred variation, it contains chemical functions which allow both cross-linking and reaction with the cellulose. This latter type of reaction advantageously creates covalent bonds, but the presence of bonds of another type is not excluded.

In this embodiment, the cross-linkable (autocondensable) polymers are thus fixed and/or trapped in the cellulose lattice, the polymers containing amine and/or amide and/or urea derivatives functions and advantageously, functions which can react with the cellulose. Particular examples of these functions are azetidinium and/or epoxy and/or N-methylol groups.

Polyalkyleneamines (aminopolyamides) are suitable for this purpose, in particular polyamide-epichlorhydrin resins (based on adipic acid, diethylenetriamine and epichlorhydrin) which contain azetidinium and/or epoxy functional groups. These resins are cross-linkable (autocondensable) in particular when heated. They can also be cross-linked at room temperature, in the presence of a catalyst (base), but in this case have slower kinetics.

These resins are commercially available, in particular from HERCULES under the trade names KYMENE 557H, KYMENE 617, KYMENE SLX2, KYMENE ULX (aminopolyamides with azetidinium reactive functions), and KYMENE 450 (aminopolyamide with epoxy reactive functions). These are currently used in the paper industry.

Copolyacrylates including nitrogen atoms are also suitable, in particular aqueous dispersions of copolyacrylates containing N-methylol functions. These are anionic copolyacrylates which are autocondensable, in particular on heating.

Aqueous dispersions of these copolyacrylates are commercially available, in particular from BASF under the trade name ACRONAL. These are currently used, as binders for non-woven materials and as coating and/or impregnation agents for textiles.

These autocondensable polymers are introduced into the materials of the invention, generally at the end of the manufacturing process, then cross-linked (generally by heating) in the materials. They are then fixed and/or trapped therein and can thus act as protective agents against bleach.

We have noted, however, that their presence in the cellulose lattice is generally prejudicial to the hydrophilic nature of the final product. Advantageously, at least one surfactant is thus used with this type of protective agent (cross-linkable polymer). The surfactant maintains the hydrophilic nature of the material. Account is taken, of course, of the nature of the medium and the conditions for the condensation (cross-linking) reaction of the polymer in selecting the surfactant. Advantageously, then, the surfactants used have the following characteristics:

they are partially soluble or dispersible in water;
they have boiling points which are higher than 100° C.;
they are at least partially miscible with polymer solutions (resin);
they can be trapped in the condensed polymer lattice so that they are only partially and gradually eliminated during use of the cellular cellulose material.

Further, they are advantageously non foaming and advantageously contain at least one nitrogen atom in the formula. In some cases, then, the protection of the material against bleach can be reinforced.

The following surfactants which can be used along with polymers such as those described above in the cellular cellulose materials of the invention are given by way of indication:

EMCOL CC36 (polyoxypropylene quaternary ammonium chloride, sold by WITCO);

EMPILAN LME (lauric acid monoethanolamide, sold by MARCHON FRANCE);

EMPILAN CME (the monoethanolamide of copra fatty acid, sold by MARCHON FRANCE);

CRILLON LDEAM (lauric acid diethanolamide, sold by CRODA CHEMICALS LTD);

COMPERLAN KD (the diethanolamide of copra fatty acid, sold by HENKEL);

ANTITERRA U 80 (mixture of unsaturated polyaminoamides and low molecular weight acid polyesters sold by BYK CHEMIE).

In this variation of the invention, the cellular cellulose material thus advantageously contains at least one surfactant which is held in the cross-linked polymer structure. The quantity of surfactant required to preserve the hydrophilic properties of the material can vary widely. It is generally in the range 0.05% to 5% by weight (with respect to the weight of dry cellulose).

The quantity of chemical protective agent contained in the material can also vary widely. It is, of course, sufficient to obtain the anticipated result. It can in some cases be limited by the number of accessible reactive functions in the cellulose lattice. In any case, care is taken not to use too much chemical agent in order not to modify too greatly the final characteristics of the regenerated cellulose based material (such as absorbing capacity or mechanical strength). The quantity of protective agent in the cellulose lattice is generally in the range 0.1% to 5% by weight (with respect to the weight of dry cellulose).

This quantity can be approximated in the finished product by measuring the amount of elemental nitrogen. This amount can be measured using the Kjeldahl method (which consists of transforming the nitrogen present in an organic substance to ammonium sulfate by attacking the substance with sulfuric acid and a suitable catalyst (powdered copper, mercury, etc) and determining the amount of ammonium sulfate formed).

A further object of the present invention is constituted by the use of chemical agents as described above—in particular the molecules and/or polymers described more specifically—for conferring improved resistance to bleach on regenerated cellulose based materials. This use is novel and inventive, including the use of agents which are already known as textile finishers, textile coating and/or impregnation agents, nonwoven binders, biocides or metal complexing agents. Thus, the present invention also deals with the use of at least a chemical agent whose structure contains at least one nitrogen atom α to a carbon atom, for confering improved resistance to bleach on regenerated cellulose based materials. The said chemical agent advantageously includes in its structure at least one unit of the type

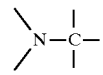

or the type

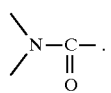

More particularly, the present invention thus concerns the use:
of molecules which contain at least one unit of the type

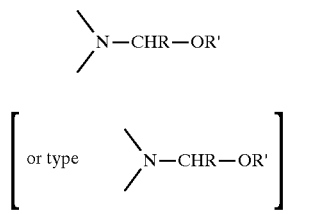

and advantageously, molecules selected from N-(hydroxymethyl)nicotinamide, N-(hydroxymethyl) phthalimide, dimethyloldihydroxyethyleneurea (DMDHEU) and its derivatives, dimethyldihydroxyethyleneurea (DMeDHEU) and its derivatives; and
of polymers containing functions of the type:

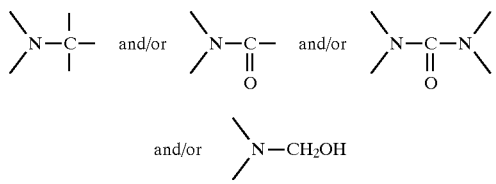

and advantageously polyamide-epichlorhydrin resins which contain azetidinium and/or epoxy functions and which are cross-linkable on heating, or aqueous dispersions of copolyacrylates containing N-methylol functions and which are cross-linkable on heating; to confer improved resistance to bleach on regenerated cellulose based materials.

This aspect of the invention—use of specific chemical agent(s) to confer improved resistance to bleach on regenerated cellulose based materials—can be defined as a method for protecting said materials from bleach, as a method for improving the resistance to bleach of said materials.

The final object of the present invention will now be described, namely a process for the preparation of the regenerated cellulose based materials whose features have been described above.

The process follows the successive steps of conventional manufacturing processes for these materials, which processes are known to the skilled person. In the process these steps are completed and/or modified by:

the introduction of the effective quantity of at least one suitable chemical agent, in its free state, for dispersion in the finished product. Introduction is carried out during or after one of these steps;

if necessary, a specific treatment for fixing and/or trapping the agent in the cellulose lattice. (The specific treatment generally consists of a heat treatment which may or may not be carried out in the presence of a catalyst).

In general, the process of the invention comprises:
preparing a cellulose solution,
optionally, adding soluble or insoluble additives to the solution to produce a mixture;
shaping the solution or mixture;
introducing the solution and/or mixture into a suitable medium and/or heating to regenerate the cellulose.
More particularly, it comprises:
for the preparation of cellular cellulose materials:
preparing a paste mass from a cellulose solution, such as viscose, fibrous matter, pigments and porophores;
shaping the mass, in particular by molding, coating both sides or one side or at least one screen or deposition on a support strip;
heating, optionally in a suitable medium, to cause the porophores to react and to regenerate the cellulose; (this has been described above)
for the preparation of fibers, filaments, sheets, textiles and non-woven materials:
preparing a cellulose solution by chemical transformation or direct dissolution of the cellulose;
optionally, adding additives such as pigments to the solution;
shaping by extrusion through a die;
introducing it into a suitable medium to precipitate and/or regenerate the cellulose.

Other conventional steps which are familiar to the skilled person can be added to these main steps and combined in characteristic fashion with the supplemental step or steps indicated above (introduction of at least one active agent+ optional specific treatment to fix and/or trap it in the cellulose lattice).

Agents (molecules and/or polymers) which can resist the conditions of the process are advantageously introduced into the cellulose solution. When preparing cellular cellulose materials, they are advantageously introduced along with the fibrous matter, pigments and porophores and are thus contained in the paste mass. These agents, introduced before regeneration of the cellulose, can be directly fixed and/or trapped in the cellulose lattice during its formation. In this case, a specific treatment is not required.

The agents which can resist the conditions of the process can, however, like their "more fragile" homologues, be introduced during the steps following regeneration of the cellulose, which steps are carried out under more gentle conditions. Different methods of introduction can be envisaged, such as spraying, coating or bath impregnation of the material. The excess solution containing the agents can be extracted by pressing or rolling.

In this hypothesis of introducing the agent after regeneration of the cellulose, a supplemental treatment specific for cellular material must generally be provided; this ensures that the agent is fixed and/or trapped in the material. As indicated above, the treatment generally consists of heat treatment.

Thus, in order to fix the molecules used in the first embodiment of the invention as described above, the following procedure is generally adopted. The molecules, advantageously those with formula (I), (II), (III) or (IV), are introduced in aqueous solution, in particular by spraying, coating or bath impregnating, into the cellulose lattice which has already been formed (after the cellulose regeneration step).

The material containing the molecules is then heat treated to fix the molecules in the material, advantageously by at least one covalent bond. Advantageously, the heat treatment involves a catalyst. This primarily permits the use of reasonable temperatures, of the order of 80° C. to 100° C., for reasonable periods. The catalyst must be introduced into the cellulose lattice before the heat treatment. It is generally introduced at the same time as the molecules.

The skilled person would be able to select a suitable catalyst, having regard to the nature of the molecules involved and the context. Advantageously:
it is stable and soluble in an aqueous medium. Regarding solubility, the above remarks apply. The use of insoluble compounds is not excluded but this would involve recycling solvent(s) and/or dispersions, thus complicating the process;

it has a low vapor tension at the temperatures encountered during the molecule fixing step;

it is compatible with and suitable for the molecules.

Two catalysts can be cited by way of illustration which are particularly suitable for fixing molecules with formulae (I), (II), (III) or (IV) to the cellulose lattice: catalysts NKS and NKD sold by HOECHST. These catalysts are based on metallic salts and organic acids.

When a latex, resin or chelating agent is involved which contains active molecules, a conventional method is followed, for example impregnation of the material and heat treatment of the impregnated material.

When a chelating agent is involved, a method as described in application WO-A-94 12034 can be used, i.e., incorporation of the agent or at least one of its principal constituents (the polymeric ligand) into the cellulose solution at the same time as the other constituents (transition metal) if necessary and the active molecule or, in a variation, incorporation of only the agent or at least one of its principal constituents into the cellulose solution; the other constituents and the active molecule are only added after regeneration of the cellulose.

It should be noted that in general, introduction of the chemical agent, which is active within the context of the invention, can be carried out in several steps, particularly when a further product is used for fixing.

In the same way, the polymers involved in the second embodiment of the invention can be fixed and/or trapped in a procedure which is generally as follows. The polymers, advantageously polyalkyleneamines or cross-linkable copolyacrylates, are introduced into the cellulose lattice which has already been constituted (after the cellulose regeneration step), introduction being effected in particular by spraying, coating or bath impregnation.

The material containing the polymers is then heat treated to cross-link the polymers and advantageously to fix them to the cellulose lattice. This heat treatment is generally carried out at about 100° C. for 1 to 2 hours in the absence of a catalyst. A catalyst (base) can, however, be used, in particular at a lower temperature, in order to accelerate the reaction.

It should be remembered that the polymers generally affect the hydrophilic nature of the material and that they are advantageously used with at least one surfactant. In this variation of the process of the invention, an effective quantity of at least one surfactant is thus introduced into the material before heat treatment. Advantageously, the polymer and surfactant are introduced at the same time.

The polymers which are active within the context of the invention can also be introduced into the material as a mixture with a latex or resin. The material is advantageously impregnated with the mixture and then heat treated.

Polymers such as chitosane can also be used earlier in the process for the preparation of regenerated cellulose based materials, before regeneration of the cellulose.

The following examples illustrate the invention.

Cellular cellulose materials in accordance with the invention, more particularly sponges, were prepared and tested (by evaluation of the tear resistance before and after ageing with bleach).

Dry cellulose sponges from the prior art (A) with the following characteristics were used as the starting material:

length (dry): 102±2 mm width (dry): 81±2 mm thickness (dry): 50±2 mm dry weight: 15.1±0.1 g Sponges (B) in accordance with the invention were prepared from prior art sponges (A).

Sponges (A) and (B) were tested before and after ageing with bleach. At least four tenacity measurements were made on samples removed from the body of the sponges:

a: tenacity of sponge A before ageing a': tenacity of sponge A after ageing b: tenacity of sponge B obtained from sponge A before ageing b': tenacity of sponge B obtained from sponge A after ageing.

In all cases, a≈b was of the order of 2 daN/cm$^2$.

At the end of each experiment, the percentage residual tenacity was measured:

for the reference sponge: a'/a (of the order of 20%)

for the treated sponge: b'/b__b'/a.

The values of a, a', b, b' were measured using a dynamometer (LHOMARGY or INSTRÖN, with a 0–100 daN cell).

For the comparative tests, "identical" samples were taken from the sponges (same direction of cut, same dimensions). Each sample was fixed between the jaws of the dynamometer, 20 mm apart, and perfectly centered. The tear measurement was taken at a pull rate of 300 mm/min.

The samples were obtained using the operating procedure described below.

Reference batch (before ageing)

the dry sponges were immersed in water;

the reference sponges were rinsed and dried;

5 cm$^2$ samples were cut out (5 cm wide by 1 cm thick) in the two directions (length, width);

the samples were stored in a plastic bag (to prevent them drying) until testing.

Aged batch (after ageing)

a 3 liter plastic beaker containing 2 liters of bleach, 1.2° Cl (i.e., 3.8 g/l of active chlorine) was placed in a thermostatic bath at 25° C.;

the bleach solution was allowed to stabilize at a temperature of 25° C.;

the pH of the solution was adjusted to 7 with $H_2SO_4$;

two sponges were completely immersed in the beaker;

the sponges were immersed for 30 min (using a further beaker weighted with water at 25° C.) (immersion by about 1 cm);

after 30 minutes, the sponges were removed and rinsed thoroughly using a well established procedure;

5 cm$^2$ samples (5 cm×1 cm) were then cut out in one direction for one sponge, and in the other direction for the other sponge;

the samples were kept in a plastic bag until testing.

The hydrophilic nature of the sponges of the invention was also studied by measuring the wettability (the time, expressed in seconds, required for a sponge placed on the water surface to become completely wet).

This measurement was carried out as follows:

the sponge was oven dried for 3 hours at 105° C.;

it was allowed to cool;

it was placed flat on a water surface and a chronometer was started;

the chronometer was stopped when the sponge was completely wet.

In order to obtain comparative results, samples of the same thickness were used, under the same conditions.

It could thus be established that incorporation of simple molecules in reasonable quantities (sufficient to obtain the anticipated result) only slightly altered the hydrophilic nature of the sponges.

EXAMPLE 1

Activity of Non Fixed Protective Agents

Oxidation tests in a neutral medium were carried out with prior art sponges (A) by introducing 1% by weight of pure protective agent (with respect to the weight of dry cellulose) into the bleach solution just before the start of the attack phase. The following results were obtained:

|  | Residual tenacity (a/a') % | |
| --- | --- | --- |
|  | with protective agent | without protective agent* |
| ARKOFIX V 4200 | 46 | 13 |
| ARKOFIX NZF | 32 | 13 |
| N-(hydroxymethyl) nicotinamide | 80 | 12 |
| KYMENE 557H | 38 | 6 |

*It should be noted that the values given in this column fluctuate as the tests were carried out on different batches of sponges. The material of one batch is never identical to that of another batch.

EXAMPLE 2

Sponges Treated with ARKOFIX V4200 Resin (DMDHEU and Its Derivatives)

An aqueous solution was made containing 1.9% (by weight) of ARKOFIX V 4200 and 0.48% (by weight) of NKS catalyst. Dry cellulose sponges (A) were sprayed with 40 g of this solution.

The treated sponges were kept in a ventilated oven at a fixed temperature of 85° C. for 24 hours and were then rinsed thoroughly then dried at 50° C. for 20 hours. Sponges (B) of the invention were obtained.

The resistance to oxidation in a neutral medium was measured (ageing test as described above). A residual tenacity of 24% (b'/a) was measured, compared with 6% for the reference sponge (a/a').

EXAMPLE 3

Sponges Treated with N-(Hydroxymethyl) Nicotinamide

An aqueous solution was made containing 1.9% (by weight) of N-(hydroxymethyl)nicotinamide and 0.48% (by weight) of NKS catalyst. Dry cellulose sponges (A) were sprayed with 40 g of this solution.

The treated sponges were kept in a ventilated oven at a fixed temperature of 85° C. for 24 hours, then 15 minutes in a ventilated oven at a temperature of 150° C. They were then rinsed thoroughly (20 compressions under running water).

The resistance to oxidation in a neutral medium was measured (ageing test as described above). A residual tenacity of 52% (b'/a) was measured, compared with 19% for the reference sponge (a/a').

The permanence of the treatment was also measured by putting the treated sponges through a washing machine cycle at 60° C. with washing powder and then, following this wash, carrying out a further neutral medium oxidation test. The residual tenacity was 48% for the treated sponge compared with 28% for the reference sponge.

EXAMPLE 4

Sponges Treated with a Polyalkyleneamine Containing Azetidinium Functions

An aqueous solution was made containing 3.125% (by weight) of a commercially available solution of KYMENE 557H (12% dry extract). Dry cellulose sponges (A) were sprayed with 40 g of this solution.

The treated sponges were kept in a ventilated oven at a fixed temperature of 100° C. for 1 hour.

The resistance to oxidation in a neutral medium was measured. A residual tenacity of 43% (b'/a) was measured, compared with 7% for the reference sponge.

Wettability was also measured. It was much lower than that of the reference sponges (time to immersion of more than 180 sec compared with 12 sec for the reference sponges).

EXAMPLE 5

Sponges Treated with a Polyalkyleneamine Containing Azetidinium Functions and a Surfactant An aqueous solution was made containing 3.125% (by weight) of a commercially available solution of KYMENE 557H (12% dry extract) and 1.87% (by weight) of ANTI-TERRA U80. Dry cellulose sponges (A) were sprayed with 40 g of this solution. The treated sponges were kept in a ventilated oven at a fixed temperature of 100° C. for 1 hour.

The resistance to oxidation in a neutral medium was measured. A residual tenacity of 45% (b'/a) was measured, compared with 8% for the reference sponge.

The wettability remained lower than that of the reference sponges (time to immersion 45 sec compared with 12 sec for the reference sponges).

EXAMPLE 6

Sponges Treated with a Polyalkyleneamine Containing Epoxy Functions and a Surfactant Aqueous solutions were made containing 3.125% (by weight) of a commercially available solution of KYMENE 450 (12% dry extract) and 1.87% (by weight) of a surfactant selected from the following: EMCOL CC36, ANTITERRA U80, CRILLON LDEAM, COMPERLAN KD, EMPILAN CME, EMPILAN LME.

Dry cellulose sponges (A) were sprayed with 40 g of this solution.

The treated sponges were kept for at least one hour in a ventilated oven at a temperature of between 80° C. and 100° C.

The resistance of these sponges (B) to oxidation in a neutral medium was then measured. The hydrophilic nature was also estimated. The following results were obtained:

|  | Residual tenacity (%) | | Time to immersion (seconds) | |
| --- | --- | --- | --- | --- |
|  | product | ref | product | ref |
| KYMENE 450 alone | 51 | 12 | >180 | 12 |
| KYMENE 450 + EMCOL CC36 | 56 | 24 | 12 | 12 |
| KYMENE 450 + ANTITERRA U80 | 47 | 9 | 15 | 12 |

-continued

| | Residual tenacity (%) | | Time to immersion (seconds) | |
|---|---|---|---|---|
| | product | ref | product | ref |
| KYMENE 450 + CRILLON LDEAM | 39 | 20 | 25 | 12 |
| KYMENE 450 + COMPERLAN KD | 45 | 15 | 30 | 14 |
| KYMENE 450 + EMPILAN CME | 52 | 20 | 55 | 13 |
| KYMENE 450 + EMPILAN LME | 54 | 19 | 65 | 13 |

The permanence of the treatment was established by putting the sponges through a washing machine cycle at 60° C. with washing powder. The resistance of these sponges to oxidation in a neutral medium was then measured. The following results were obtained:

| | Residual tenacity (%) | |
|---|---|---|
| | product | reference |
| KYMENE 450 + EMCOL CC36 | 42 | 12 |
| KYMENE 450 + ANTITERRA U80 | 54 | 18 |

EXAMPLE 7

Sponges Treated with Copolyacrylates Containing N-Methylol Functions

Two paste masses ($M_1$ and $M_2$) were made from viscose containing 19 kg of α-cellulose, 2.8 kg of cotton fibers, 6.24 kg of linen, 0.43 kg of dye and 1080 kg of Glauber's salt.

1.68 kg of commercially available ACRONAL 32D (aqueous dispersion containing 50% of dry extract) was added to paste mass $M_1$; paste mass $M_1'$ was thus obtained.

Paste masses $M_1'$ and $M_2$ were mixed for about 10 minutes, then molded and brought into contact with a basic medium (pH close to 12) at a temperature of about 100° C. for several hours (basic regeneration, which advantageously uses a basic sodium sulfate solution).

The products obtained—cellular cellulose materials—were then rinsed, bleached if necessary, then dried and cut into sponges using a conventional procedure.

Paste masses $M_1'$ and $M_2$ produced sponges $E_1$ and $E_2$ respectively.

The resistance to oxidation in neutral medium of these sponges was then measured (ageing test as described above).

A residual tenacity of 60% was observed for the treated sponges ($E_1$) compared with 25% for the reference sponges ($E_2$).

The permanence of the treatment was also established by putting the treated ($E_1$) and untreated ($E_2$) sponges through a washing machine cycle at 60° C. with washing powder and then carrying out a further neutral medium oxidation test. The residual tenacity was 57% for the treated sponges ($E_1$) compared with 25% for the untreated sponges ($E_2$).

It can be seen that, in this variation of the invention—adding acrylate copolymers containing N-methylol functions before regeneration of the cellulose—the acrylate copolymers do not have a prejudicial effect on the hydrophilic nature of the treated sponges. In this context, the use of surfactants is completely unnecessary.

We claim:

1. A cellular cellulosic material containing a cellulose lattice and 0.1 to 5% by weight, with respect to the weight of dry cellulose, of at least one cross-linked polymeric agent improving resistance of the cellulose lattice to bleach and contained in the lattice in a stable manner to ensure durable protection of the lattice aganst the bleach; said polymeric agent, prior to incorporation in the cellulosic material being selected from the group consisting of:

(a) cross-linkable polymers which contain in their formula N-methylol functions $$\left[ \begin{array}{c} \diagdown \\ \diagup \end{array} N-CH_2OH \right];$$

and (b) cross-linkable polymers which contain functions in their formula which are an amine $$\left[ \begin{array}{c} \diagdown \\ \diagup \end{array} N-\overset{|}{\underset{|}{C}}- \right],$$

an amide $$\left[ \begin{array}{c} \diagdown \\ \diagup \end{array} N-\overset{}{\underset{\|}{C}}- \\ \phantom{N-}O \end{array} \right],$$

an urea derivative $$\left[ \begin{array}{c} \diagdown \\ \diagup \end{array} N-\overset{}{\underset{\|}{C}}-N \begin{array}{c} \diagup \\ \diagdown \end{array} \\ \phantom{N-}O \end{array} \right],$$

or a mixture thereof,
and wherein said polymers (b) contain azetidinium and/or epoxy groups which are able to react with the cellulose.

2. A cellular cellulosic material according to claim 1, wherein said polymeric agent is a cross-linkable polymer which contains in its formula both amine and/or amide and/or urea derivative functions and azetidinium and/or epoxy and/or N-methylol groups.

3. A cellular cellulosic material according to claim 1, wherein said polymeric agent is a cross-linkable polyamide-epichlorhydrin resin which contains azetidinium and/or epoxy groups.

4. A cellular cellulosic material according to claim 1, wherein said polymeric agent is a cross-linkable copolyacrylate which contains N-methylol groups.

5. A cellular cellulosic material according to claim 1, which contains at least one surfactant which is held within the polymeric structure.

6. A cellular cellulosic material according to claim 1, which is a sponge or sponge-cloth.

7. A cellular cellulosic material containing a cellulose lattice and 0.1 to 5% by weight, with respect to the weight of dry cellulose, of at least one cross-linked polymeric agent improving resistance of the cellulose lattice to bleach and contained in the lattice in a stable manner to ensure durable protection of the lattice against the bleach produced by forming a cellulose solution and incorporating in the cellulosic material cross-linkable polymers selected from the group consisting of:

(a) cross-linkable polymers which contain in their formula N-methylol functions

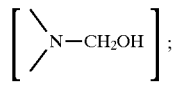

and (b) cross-linkable polymers which contain functions in their formula which are an amine

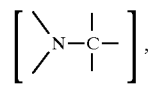

an amide

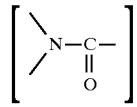

an urea derivative

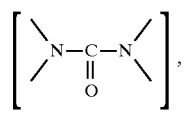

or a mixture thereof,
and wherein said polymers (b) contain azetidinium and/or epoxy groups which are able to react with the cellulose; to form a mixture and reacting said mixture to form said cellular cellulosic material.

8. A cellular cellulosic material according to claim 7, wherein said polymeric agent is a cross-linkable polymer which contains in its formula both amine and/or amide and/or urea derivative functions and azetidinium and/or epoxy and/or N-methylol groups.

9. A cellular cellulosic material according to claim 7, wherein said polymeric agent is a cross-linkable polyamide-epichlorhydrin resin which contains azetidinium and/or epoxy groups.

10. A cellular cellulosic material according to claim 7, wherein said polymeric agent is a cross-linkable copolyacrylate which contains N-methylol groups.

11. A cellular cellulosic material according to claim 7, which contains at least one surfactant which is held within the polymeric structure.

12. A cellular cellulosic material according to claim 7, which is a sponge or sponge-cloth.

* * * * *